United States Patent [19]

Shiels et al.

[11] Patent Number: 5,751,953
[45] Date of Patent: May 12, 1998

[54] INTERACTIVE ENTERTAINMENT PERSONALISATION

[75] Inventors: Martin A. Shiels, Bristol; Richard S. Cole, Redhill; Paul J. Rankin, Horley; Rosa Freitag, London, all of England

[73] Assignee: U.S. Philips Corporation, New York, N.Y.

[21] Appl. No.: 705,887

[22] Filed: Aug. 29, 1996

[30] Foreign Application Priority Data

Aug. 31, 1995 [GB] United Kingdom ............... 9517808

[51] Int. Cl.$^6$ ...................................................... G06F 17/00
[52] U.S. Cl. ...................................................... 395/200.09
[58] Field of Search ........................... 364/514 A, 514 R; 348/13, 16; 455/5.1; 463/30, 31; 273/429, 430; 395/200.09, 173

[56] References Cited

U.S. PATENT DOCUMENTS

| | | | |
|---|---|---|---|
| 3,318,517 | 5/1967 | Wells | 235/52 |
| 4,305,131 | 12/1981 | Best | 364/521 |
| 4,333,152 | 6/1982 | Best | 364/521 |
| 4,445,187 | 4/1984 | Best | 364/521 |
| 4,569,026 | 2/1986 | Best | 364/521 |
| 4,846,693 | 7/1989 | Baer | 434/308 |
| 5,005,143 | 4/1991 | Altschuler et al. | 364/554 F |
| 5,077,607 | 12/1991 | Johnson et al. | 348/13 |
| 5,161,034 | 11/1992 | Klappert | 358/342 |
| 5,377,997 | 1/1995 | Wilden et al. | 273/434 |
| 5,417,575 | 5/1995 | Mctaggart | 434/308 |
| 5,581,479 | 12/1996 | McLaughling et al. | 364/514 A |
| 5,611,694 | 3/1997 | Bromley | 434/311 |
| 5,634,849 | 6/1997 | Abecassis | 463/30 |

FOREIGN PATENT DOCUMENTS

| | | |
|---|---|---|
| B7270987 | 1/1991 | Australia . |
| B3595889 | 8/1991 | Australia . |
| WO9208531 | 5/1992 | WIPO . |
| WO9413105 | 6/1994 | WIPO . |
| WO9427677 | 12/1994 | WIPO . |

OTHER PUBLICATIONS

"Interactive Entertainment Apparatus", U.S. Serial No. 08/705,888.
"Interactive Entertainment Content Control", U.S. Serial No. 08/705,548.
"Information Handling for Interactive Apparatus", U.S. Serial No. 08/705,584.
"Interactive Entertainment Attribute Setting", U.S. Serial No. 08/705,889.
Furht et al.; "Design Issues for Interactive Television Systems"; Computer Magazine, May 1995.

Primary Examiner—Ellis B. Ramirez
Attorney, Agent, or Firm—Debra K. Stephens

[57] ABSTRACT

A method and apparatus are provided for enabling user interaction with a branch-structured narrative entertainment (90) in which branch path selection (A,B,C) is made at least partially in response to user input. A user is provided with a non-volatile memory, such as a smart card, in which memory is stored data specifying a record of past user interactions. This data is periodically checked and updated by the apparatus and, at one or more branch points (92) of the narrative, access to one or more branch paths (A,B,C) is enabled or denied on the basis of the stored user history.

10 Claims, 4 Drawing Sheets

INTERACTIVE ENTERTAINMENT PERSONALISATION

BACKGROUND OF THE INVENTION

1. Field of the Invention

The present invention relates to interactive entertainment systems and, in particular, to such systems in which the user is able to control, directly or indirectly, the path of a narrative or plot line.

2. Description of the Related Prior Art

An example of such a system is described in U.S. Pat. No. 4,305,131 to Robert M. Best, and comprises a motion picture system in which the viewer is treated as a character in the narrative. At branch points in the narrative, a character on screen will ask a question of the viewer: the viewer is provided with a hand held menu screen on which two or more command words appear, which words are amongst the limited vocabulary of a speech recognition unit of the system. The branch taken by the narrative will depend on how the viewer responds to the on-screen characters question, that is to say which of the command words is spoken by the viewer. The multiple story lines are held on optical disc as independently addressable video frames, blocks of compressed audio and/or cartoon graphics.

In order to further enhance the user's feeling of being a part of the narrative, Best proposes inserting recordings of the user's name into the dialogue accompanying the narrative, such that the actors within the narrative speak to the user using the user's own name. Despite these extra "personalising" features, the Best system is still somewhat limited in that, for each branch point of the narrative, the requests for user input follow the same general form.

SUMMARY OF THE INVENTION

It is an object of the present invention to provide an interactive entertainment which is self modifying through the course of the narrative in response to user input, such as to provide a "reward" for or to the user.

In accordance with the present invention there is provided an interactive entertainment apparatus operable to output sequences of image frames comprising a user-influenced path through a branch structured narrative, the apparatus comprising: a source of image frame data for all branch structure paths of the narrative; branch storage means for data defining the narrative branch structure; user operable input means; branch selection means coupled to the branch store and operable to determine when the narrative reaches a branch point and to call one of two or more image frame sequences from the image frame source in dependence on the user input; and an output for the selected image frame sequences; characterised in that the apparatus further comprises a user memory and the branch selection means is arranged to record therein data specifying two or more past user inputs, and to refuse or enable access to at least one path from a branch path in dependence on the stored past input data.

The contents of the paths to which the user may granted or denied access may, for example, contain scenes in which one or more characters of the narrative address the user in familiar terms. In other words, if the user has not "met" (interacted with) the character previously the narrative could appear disjointed if access was granted to narrative scenes requiring the user to have previously encountered the character.

The types of user input may be divided into two or more classes, with the branch selection means being operable to determine, for each instance of interaction, the class into which the user input falls, with separate stores being maintained of user input data within the user memory for each class. This would allow, for example, the maintenance of separate user interaction histories for different characters within the narrative.

The user memory is suitably a non-volatile device, such as a smart card, such that, where the interactive narrative is of an episodic nature (such as a soap opera), the history of user interactions with the various characters may be maintained from episode to episode. The stored history of user interactions may suitably be in the form of a cumulative value, although the store preferably maintains an identifier as to each particular interaction such that the oldest stored data may be periodically deleted, with only a finite number of past interactions being recorded. The cumulative selection value may suitably be used by the branch selection means as the basis for enabling/disabling access to a branch point path in dependence on its value relative to a given threshold for that branch point.

Also in accordance with the present invention, there is provided a method for control of an interactive entertainment apparatus, as defined in the attached claims to which reference should now be made.

BRIEF DESCRIPTION OF THE DRAWINGS

Further features and advantages of the present invention will become apparent from reading of the following description of preferred embodiments of the present invention, given by way of example only, and with reference to the accompanying drawings in which.

DETAILED DESCRIPTION OF THE PREFERRED EMBODIMENTS

In the following, we concentrate particularly on the case where the image frames accompanying the narrative are video frames, although as will be recognised (and as will be described), the present invention is equally applicable to sequences of animated image frames, and compound image frames composed of overlying portions of animation and video.

Figure 1:
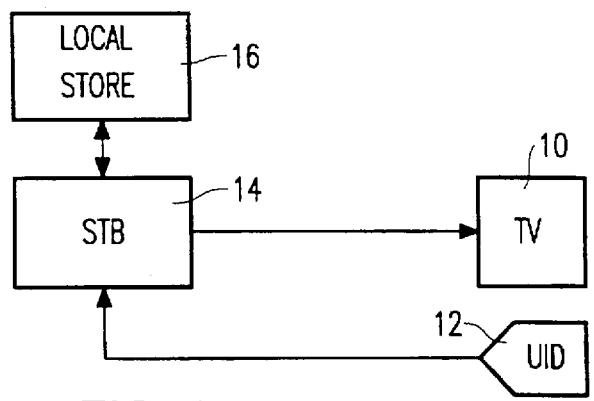
FIGS. 1 to 4 show differing combinations of material source supplying a user interface apparatus embodying the present invention.

FIGS. 1 to 4 represent a number of different ways by which an interactive narrative may be supplied to a user. In each case, the user views the received narrative on a monitor screen 10, suitably a television set, and is provided with an input device (UID) 12 for inputting commands, responses or other data as required by the particular application. In addition, the user is provided with an interface in the form of a set top box (STB) 14 to which the narrative source or sources are coupled, to which the user commands are input, and from which the television receives the signal for display. The user input device 12 has a few simple controls as required by the application, for example three select buttons and up/down/left/right shift controls or a joystick, and may be hard wired to the STB as shown in FIG. 1, or connected by infrared (IR) link in known manner as in FIG. 2.

Figure 2:
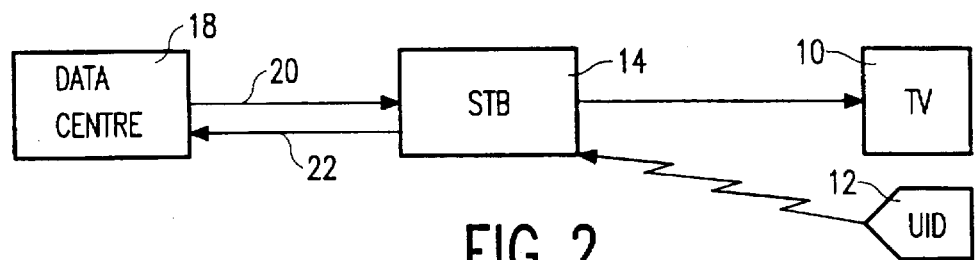
Figure 3:
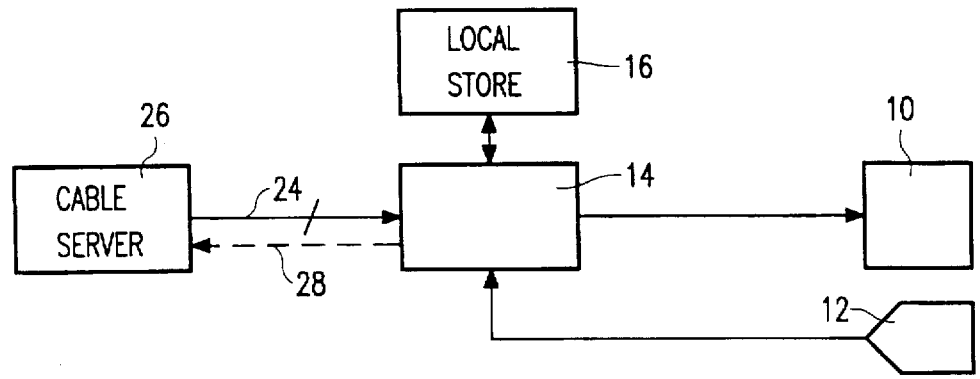
Figure 4:
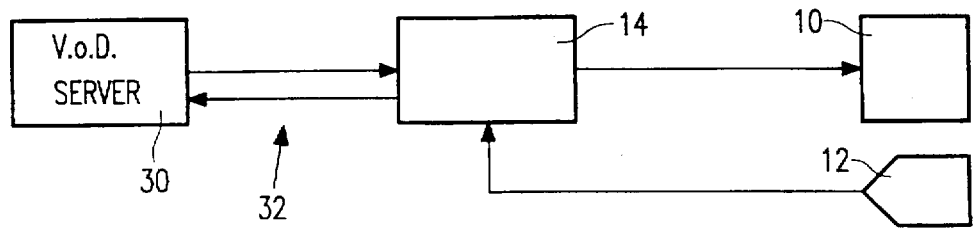

In the embodiment of FIG. 1, the narrative video and structure together with subsidiary information is supplied wholly from a local data source 16, such as a compact disc player or CD-ROM. In the embodiment of FIG. 2, the narrative video, structure and other information is supplied wholly from a remote source 18 via a data network 20, with user commands being sent to the remote source via a return path 22 of the network. In the embodiment of FIG. 3, the narrative video and other information is supplied as multiplexed channels on a single line 24 from a remote source 26, such as a cable television network server and is supplemented by information such as the structure from the local data source 16. In order to avoid the need for mass memory at the user site a return line 28 may be provided to give the user site at least partial control over the information sent out. In the embodiment of FIG. 4, the narrative is supplied via a Video on Demand (VoD) system from a server 30 over a network 32, access to which may require the user to enter an identification code or insert a smart card or similar into an appropriate card reader to enable decryption of encrypted signals. As will be described, rather than providing separate units for decryption and card reading, these functions may be provided within the STB.

Figure 5:
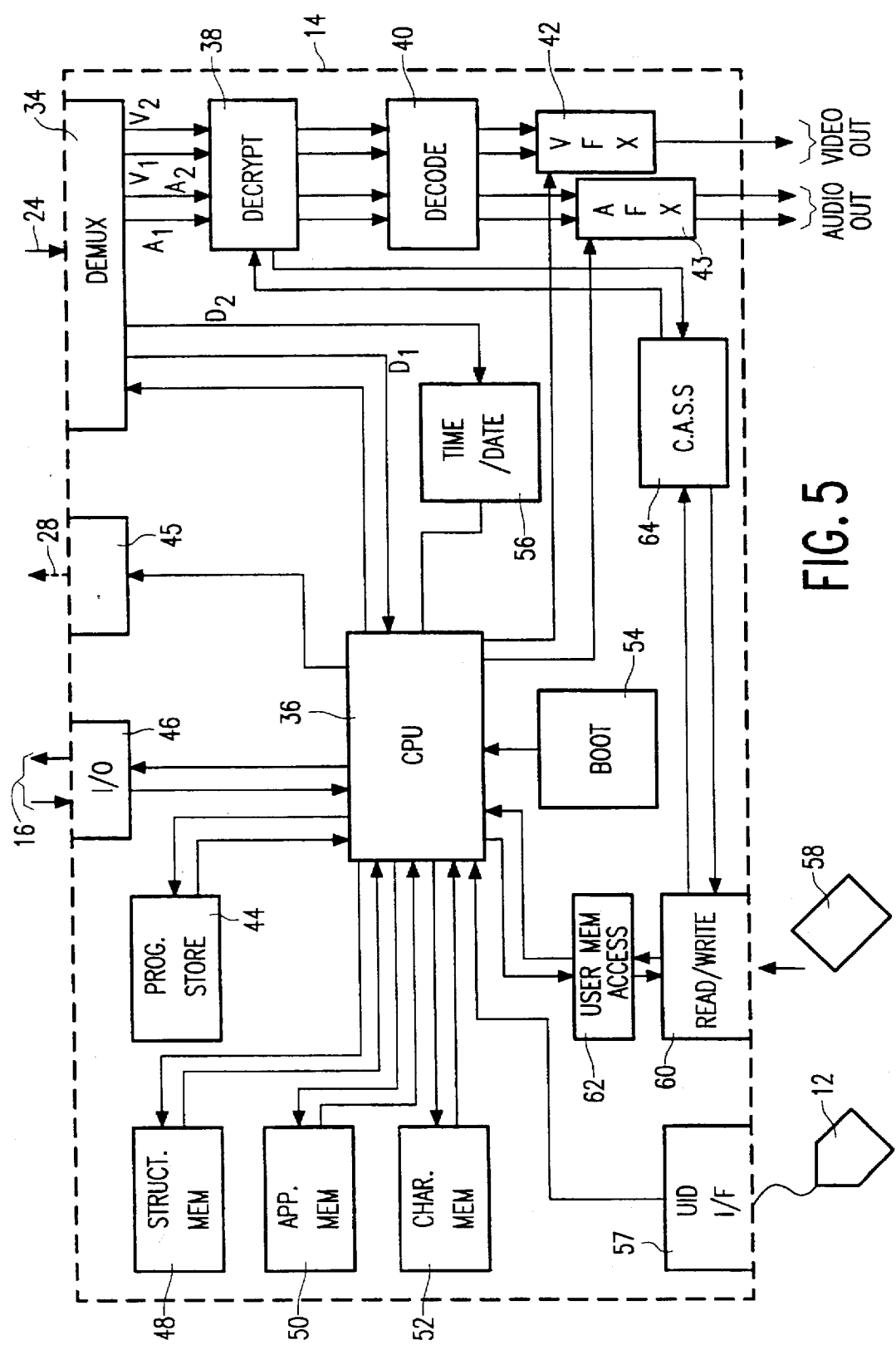
FIG. 5 is a schematic representation showing the user interface apparatus of FIG. 3 greater detail.

FIG. 5 shows the internal structure of the STB 14 when set up for the configuration of FIG. 3, that is to say with input from both remote source 26 via network 24 and local source 16. The incoming signal from the network 24 contains a number of independent service components (audio, video and data streams) multiplexed together. In this example, the signal contains two data streams $D_1$ and $D_2$ the functions of which are explained below, together with two audio streams $A_1$ and $A_2$ (for example left and right channels of a stereo audio signal) and two video frame streams $V_1$ and $V_2$. The multiplexed signal is received by a demultiplexer 34 which splits it into the separate components under control of a processor 36. Before being output from the STB the audio and video may pass through decryption 38 and decoding 40 stages, the video signals may be processed 42 to provide video effects such as picture-in-picture (PIP), and the audio may also be treated 43, as will be described below.

The first of the data streams $D_1$ is input to the processor 36 and contains program information specifying how the processor is to handle the audio and video streams and other information specific to features of the particular interactive narrative. This program information is held by the processor in program store 44. A specification for the branch structure of the narrative may be downloaded via $D_1$ (in response to a processor call on the network return path 28, via interface 45) or it may be read from local storage 16 via interface 46, with the processor sending track addressing and play commands as required. The branch structure is stored in structure memory 48, with further memories being provided for application features 50 and character features 52, as may be required by particular forms of narrative entertainment. Whilst shown in the Figure as separate stores, it will be readily appreciated that the program store 44 and the structure, application and character memories, 48, 50, 52 may be provided as respective areas of a single memory, provided that the more detailed addressing and associated access times for the larger memory do not unduly affect performance.

On powering up of the STB 14, a bootstrap loader 54 initialises the processor and instructs it to call for the branch structure and program information from the appropriate sources. Alternatively, and more simply, the bootstrap loader 54 may just initiate the calling up of the program information, with the first instruction of that program information being for the processor 36 to call up the branch structure and store it in program store 44.

Some narrative applications may require information as to the current date and time of day and, to avoid the need for the STB to maintain an accurate, non-volatile, clock source, a time/data store 56 is provided, with the timing information being updated at regular intervals from the remote source using data component stream $D_2$ as shown. For the FIG. 1 embodiment, where there is no remote source, the data/time information might be obtainable from the local source if that maintained its own clock.

Signals from the user input device (UID) 12 are received by the STB at UID interface 57 and, from there passed to the processor 36. If, as in FIG. 2, the UID 12 is coupled to the STB via infra-red link, the interface 56 would include a suitable infra-red receiver.

Some forms of narrative entertainment may be sporadic or episodic with the equipment being switched off in between sessions. To avoid the user being forced to re-start from scratch each time the equipment is switched on, a non-volatile user memory is provided in which features such as a history of the users interactions (as will be described), the user's current position within a narrative, user preferred system settings etc are stored. The user memory may suitably be held on a removable storage device such as a smart card 58 with the STB having a suitable card reader 60 with access to that area of the card storing the user memory being made via user access control 62: user memory access control 62 may, alternatively, be a purely software route executed within processor 36.

In some circumstances, the interactive entertainment may be provided by a remote server on a "pay-per-play" basis with the audio and video signals being transmitted in encrypted form and requiring particular key codes to enable them to be decrypted. In such a situation, the smart card 58 providing the non-volatile user memory may have a further function as a part of the decryption system. In such a case, the smart card 58 would carry a series of the codes, one or more of which would be required by decrypter 38 to decrypt the audio and video signals. Data stream $D_1$ would contain an identifier for one or more of the codes which identifier would be passed to a conditional access sub-system (CASS) 64, which in turn would use the identifier to address the stored codes on the smart card (via card reader 60) and, having obtained the necessary code or codes from the smart card, the CASS 64 would forward the obtained codes to the decrypter 38.

Where the video and/or audio signals are transmitted in compressed form, for example discrete cosine transform coded video according to MPEG standards, the decoder 40 may be provided. A switchable by-pass to the decoder (not shown) may be provided for the case where the display (television) is already equipped with, and set up for, decoding of the standard.

The video effects stage 42 is operated under control of the processor 36 to provide those features of the displayed image which are locally generated under the direction of the application program and/or user input, rather than being present in the video data supplied from the remote or local source. Such features may include menu bars, user movable cursors, system messages and so forth. As previously mentioned, one of the possible video effects is picture-inpicture (PIP) where the in-screen picture may be used to provide supplementary or future historical information about the narrative to the user. In one possible arrangement, video data streams $V_1$ and $V_2$ may synchronously show a particular scene of the narrative being played out, but with each being presented through the "eyes" of a different character within the scene.

Where the narrative is composed of animated (rather than video) images, the effects stage 42 may handle the rendering of the images, with the remote source supplying the source and instruction data. Whilst this would require a significant increase in processing power for the STB, the user interaction could then include modification of the images themselves in addition to directing narrative branch point selection. The effects stage may also handle the compilation and mixing of compound images, for example applying remotely-supplied video sprites to a locally-generated graphical background.

The audio effects stage 43 may be used for processing of the received audio signals $A_1, A_2$ in order to generate effects such as echo, without requiring supply and/or storage of multiple versions of an audio segment. The stage may also be used for local generation of some sound effects, suitably those required as immediate response to a user input, with basic waveform data, call commands and so forth being downloaded to the application memory 50 at the start of a session or on initialisation.

Figure 6:
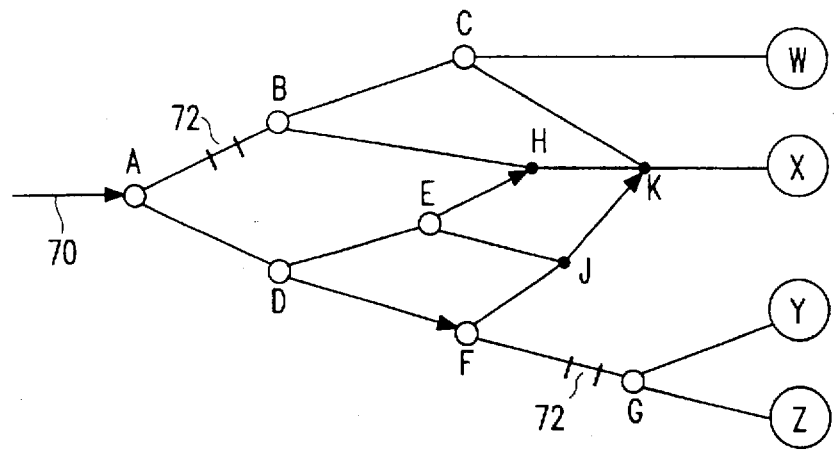
FIGS. 6 and 7 illustrate differing arrangements of interactive narrative structure.

Different arrangements of narrative structure may be supported by the STB of FIG. 5, making use of various of the facilities it provides, as required by the particular form of the narrative. FIG. 6 shows a branched narrative structure starting with a common introductory portion 70, which would serve to set the scene for the narrative, introduce the viewer to the characters and so forth. At branch nodes A to G a decision is required as to which path the narrative will take, with the user navigating through the network of possible story lines to reach one of the four possible endings W to Z. In order to avoid an "explosion" of possible endings, which would require a large amount of video data to be available for a relatively short narrative, some paths combine (at nodes H, J and K) such that some sections of the narrative (for example H to K) may appear within the narrative regardless of which path is chosen at node A for example. In order to maintain the user's "immersion" in the narrative story line it is important that, at both branching and combining nodes there is no discernable break in the video stream. Detailed techniques for seamless joining of video sequences are described in, for example, our copending United Kingdom patent applications 9424429, 9424436 and 9424437 (our references: PHB 33952, PHB 33950 and PHB 33951). A principal requirement for seamless joining is that the system has sufficient time to call up the selected next video segment and synchronise its start to the end of the present sequence. To enable this, a finite period prior to the end of the present video sequence is provided, for example as shown at 72 in FIG. 6, during which period the user may interact via UID 12 (FIG. 1). The location of the interaction periods 72 relative to the narrative is a feature of the structure, and is held in structure memory 48 of the STB (FIG. 5).

The existence of an interaction period may be indicated to the viewer in a number of different ways. For example, a menu of possible options may be displayed on the screen: this menu is preferably provided via the video effects unit 42 of the STB such that, as soon as the user has selected an item, the menu may be removed from the screen to minimise the intrusion. The positioning of the menu should be such as to avoid blocking the on-screen story and may be provided as, for example, a picture-in-picture or as a pull-up menu which the user can access during an interaction period.

Each branch node of the narrative is preferably provided with a default setting such that, if there is no user input during the interaction period 72, then the narrative will continue along the default path without stalling for lack of instruction.

The audio accompaniment to the video sequences of FIG. 6 is not tied to the video itself but instead is called up as a feature of the narrative structure. This enables sections of the audio (such as dramatic or background music) to be re-used during the course of the narrative, for example to provide an audio cue instead of, or in addition to, a visual cue indicating that interaction may take place or is now required. As mentioned, some of this audio may be generated locally.

Figure 7:
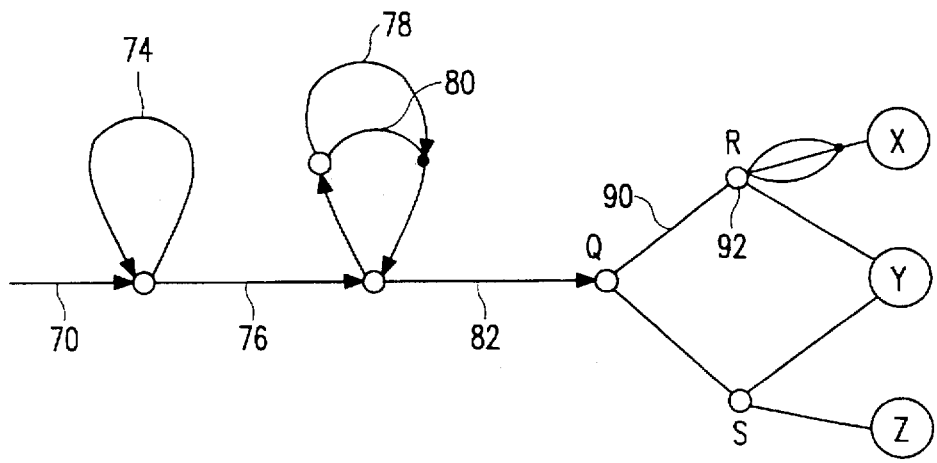

An alternative arrangement for the branch structure is shown in FIG. 7. As before, the narrative starts with a common introductory portion 70 leading to a first branch node L. Instead of a diverging branch output, branch node L provides access to a narrative loop 74 which returns to node L at its end, following which the narrative continues along path 76 to another branch node M. The narrative loop 74 may be used to enable the viewer to access background or subsidiary information to the narrative: the default setting for node L would be to continue with narrative section 76. At node M, a further narrative loop is provided having within that loop a further branch node N and recombining node P linked by two possible loop narrative paths 78 and 80. Multiple loop nestings, as well as loops within loops may be provided. As shown, the narrative loop structure may be combined with a diverging branch structure, with diverting branch node Q following narrative section 82 and further branch nodes R and S leading to conclusion of the narrative at one of three possible ending X, Y or Z.

Figure 8:
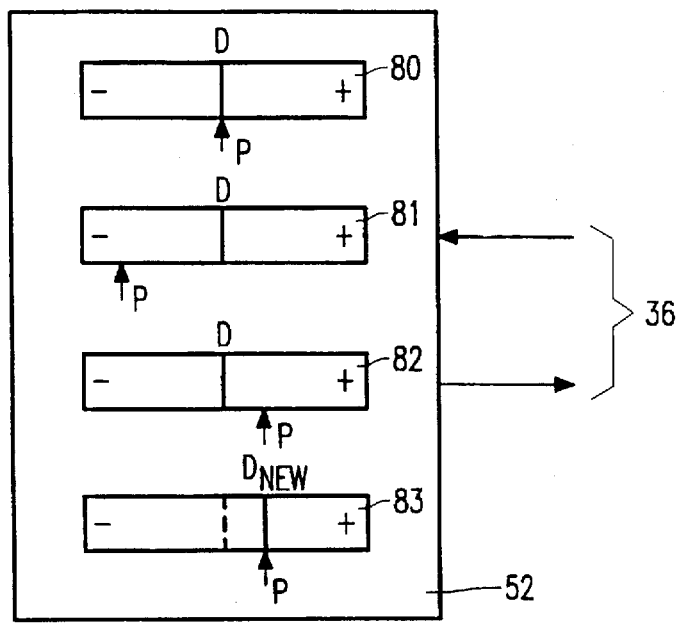
FIG. 8 schematically represents the operation of the user memory of FIG. 5.
Figure 9:
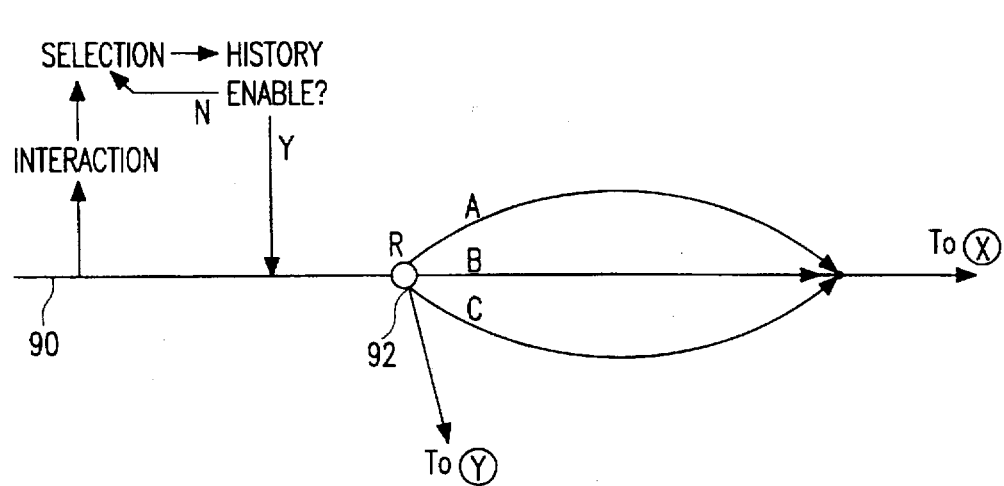
FIG. 9 represents a segment of the narrative structure of FIG. 7, including a history dependent branch point.

In order to "reward" a user for past interactions, path selection at some of the narrative branch points is made dependent on the users previous interactive. Figure 8 schematically represents how the user memory (on smart card 58, FIG. 5) is arranged to provide the historical information. A number of sliding scales 80 to 83 are provided, each having a pointer to a current value P and a central default value D. On initialisation of the system, at the user's first play, each of these scales is given a first value and is assigned to a respective character or feature of the narrative. From initial settings at the default value D (or possibly a user-selected start point) the pointers will be moved up or down the scale as the user takes part in interactions related to that character. Using a part of the narrative structure of FIG. 7, expanded in FIG. 9, as an example, the user "values" associated with a character appearing in each branch of the narrative prior to branch node R may be as follows:

| Path | Value |
| --- | --- |
| 70 | +1 |
| 74 | −4 |
| 76 | +2 |
| 78 | −2 |
| 80 | +2 |
| 82 | −1 |
| 90 | 0 |

The decision at branch node R may then be set such that, if the users accumlated total (the pointer position) is greater than or equal to +4 then access to path A is permitted, and an accumulated total of −4 or lower would enable access to path C, whilst any value between +3 and −3 would result in automatic selection of default path B.

In addition to the narrative sequence character values altering the stored user values, the branch nodes themselves may have an effect on the stored values, for example incrementing, decrementing or resetting to the default values. Also, the default values themselves may be movable with, for example, consistent or extreme pointer positioning on one side of the default leading to gradual movement of the default towards that side, as shown for scale 83 in FIG. 8.

Rather than wholly automatic selection on the basis of accumulated user totals, this feature may instead be used to selectively lock or unlock certain paths of a narrative. The decision at branch node Q would then be available to the user only if they had accumulated sufficient user values earlier in the entertainment, and the "unlocked" branch might contain scenes where the character appears to address the user in a familiar manner, or scenes of personal revelations from characters. In situations where insufficient user values have been accumulated, the system may react to user-directed selection is of a locked branch with a displayed and/or audio message (generated through video and/or audio effects stage 42,43) such as "Path Closed" to alert the user to the need to take different pathways on the next play of the entertainment. Alternatively, where only one unlocked path is available from a node, the visual and/or audio cues to the user to interact may suitably be suppressed and the unlocked path automatically selected as a default, such that the chance to interact may come as a surprise to the user on a subsequent playing.

Where the entertainment is episodic, the user is provided with a chance to save user memory settings or erase them at the end of each episode. By storing the memory settings, the user reward for interaction may be carried from one episode to the next.

From reading the present disclosure, other modifications and variations will be apparent to persons skilled in the art. Such modifications and variations may involve other features which are already known in the art and which may be used instead of or in addition to features already described herein. For example, some of those features described in relation to the STB (14, FIGS. 1 to 5) may instead be provided within a personal computer and others within a television or display unit. The reference to an apparatus in the following claims will be readily understood to cover all arrangements where the various recited features operate together in the manner described, regardless of whether those features are provided in a single unit or distributed amongst a number of interconnected units.

Although claims have been formulated in this application to particular combinations of features, it should be understood that the scope of the disclosure of the present application also includes any novel feature or combination of features disclosed herein either explicitly or implicitly, whether or not relating to the same invention as presently claimed in any claim and whether or not it mitigates any or all of the same technical problems as does the presently claimed invention. The applicants hereby give notice that new claims may be formulated to such features and/or combinations of such features during prosecution of the present application or of any further application derived therefrom.

What is claimed is:

1. Interactive entertainment apparatus operable to output sequences of image frames comprising a user-influenced path through a branch structured narrative, the apparatus comprising:

a source of image frame data for all branch structure paths of the narrative;

branch storage means for data defining the narrative branch structure;

user operable input means;

branch selection means coupled to the branch storage means and operable to determine when the narrative reaches a branch point and to call one of two or more image frame sequences from the image frame source in dependence on the user input;

an output for the selected image frame sequences; and a user memory, the branch selection means being arranged to record therein data specifying two or more past user inputs, and to refuse or enable access to at least one path from a branch path in dependence on the stored past input data.

2. Apparatus as claimed in claim 1, wherein user inputs are divided into two or more classes, and the branch selection means is operable to determine, for each interaction, the class into which the user input falls and to maintain separate stores of user input data in the user memory for each class.

3. Apparatus as claimed in claim 1, wherein data specifying a finite number of past user inputs is stored in the user memory, with the branch selection means being arranged to delete the oldest stored data when this finite number is reached.

4. Apparatus as claimed in claim 1, wherein the user memory is a non-volatile device.

5. Apparatus as claimed in claim 4, wherein the user memory is held on a removable card, with the apparatus further comprising means for receiving, reading from, and writing to the card.

6. Apparatus as claimed in claim 1, wherein each user input is assigned a numerical value, and the branch selection means generates and maintains a selection value derived from past user input values, and the branch selection means enables or refuses access to said at least one path in dependence on the current selection value relative to a threshold value for the branch point.

7. A method for control of an interactive entertainment apparatus, where the apparatus presents to the user a branch structured narrative, and user input determines which path is followed at at least one narrative branch point, characterised in that a history is maintained of a user's interactions and branch path selection at at least one narrative branch point is enabled or disabled on the basis of the user history.

8. A method as claimed in claim 7, wherein enabling of a branch path selection automatically triggers selection of that branch path.

9. A method as claimed in claim 7, wherein the interactive entertainment is episodic and the apparatus is inactive between episodes, with the user interaction history being maintained and carried over successive episodes.

10. A method as claimed in claim 7, wherein at least a part of the history is deleted at predetermined intervals.

* * * * *